United States Patent
Jing et al.

(10) Patent No.: US 11,926,221 B2
(45) Date of Patent: Mar. 12, 2024

(54) OPEN-LOOP CONTROL FOR TRANSIENT OPERATION OF A ROTARY ELECTRIC MACHINE

(71) Applicant: GM GLOBAL TECHNOLOGY OPERATIONS LLC, Detroit, MI (US)

(72) Inventors: Xin Jing, Rochester, MI (US); Bojian Cao, Pontiac, MI (US); Brent S. Gagas, Ferndale, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 521 days.

(21) Appl. No.: 17/031,052

(22) Filed: Sep. 24, 2020

(65) Prior Publication Data
US 2022/0089034 A1  Mar. 24, 2022

(51) Int. Cl.
| | |
|---|---|
| *H02P 25/10* | (2006.01) |
| *B60L 15/02* | (2006.01) |
| *B60W 30/188* | (2012.01) |
| *H02P 21/20* | (2016.01) |

(52) U.S. Cl.
CPC ......... *B60L 15/025* (2013.01); *B60W 30/188* (2013.01); *H02P 21/20* (2016.02); *B60L 2240/423* (2013.01); *B60L 2240/429* (2013.01); *B60W 2510/083* (2013.01); *B60W 2510/085* (2013.01); *B60W 2520/40* (2013.01)

(58) Field of Classification Search
CPC ............. B60L 15/025; B60L 2240/423; B60L 2240/429; B60W 30/188; B60W 2510/083; B60W 2510/085; B60W 2520/40; H02P 21/20; Y02T 10/64
See application file for complete search history.

(56) References Cited

U.S. PATENT DOCUMENTS

| | | | |
|---|---|---|---|
| 10,171,019 B1 | 1/2019 | Xu et al. | |
| 2003/0151385 A1 | 8/2003 | Wu et al. | |
| 2004/0257028 A1* | 12/2004 | Schulz | H02P 21/28 318/268 |

(Continued)

*Primary Examiner* — Muhammad S Islam
(74) *Attorney, Agent, or Firm* — Quinn IP Law (57) ABSTRACT

A method for controlling transient operation of a variable flux machine (VFM) includes, during a shunt angle transition, receiving a commanded and measured shunt angle when operating in a predetermined operating region, e.g., maximum torque per ampere or field weakening. The method includes calculating d-axis and q-axis delta current terms ($\Delta I_d$ and $\Delta I_q$) required to maintain an output torque level of the VFM through a duration of the shunt angle transition, then applying the required $\Delta I_d$ and $\Delta I_d$ terms as feed-forward terms to adjust a d-axis current ($I_d$) term and a q-axis current ($I_q$) term from a respective lookup table. In this manner the controller maintains the output torque level of the VFM during the shunt angle transition. An electric powertrain includes the VFM, a TPIM, and the controller. A PM machine may be controlled by substituting temperature for shunt angle.

20 Claims, 8 Drawing Sheets

(56) References Cited

U.S. PATENT DOCUMENTS

| | | | |
|---|---|---|---|
| 2011/0031919 A1* | 2/2011 | Green | H02P 21/0089 |
| | | | 318/432 |
| 2014/0203754 A1* | 7/2014 | Bhangu | H02P 21/12 |
| | | | 318/702 |
| 2015/0091483 A1 | 4/2015 | Osamura et al. | |
| 2015/0130376 A1 | 5/2015 | Pace | |
| 2015/0236632 A1* | 8/2015 | Marohl | H02P 23/0077 |
| | | | 318/722 |
| 2017/0085202 A1 | 3/2017 | Yoo et al. | |
| 2022/0399843 A1* | 12/2022 | Urayama | H02P 6/34 |

* cited by examiner

OPEN-LOOP CONTROL FOR TRANSIENT OPERATION OF A ROTARY ELECTRIC MACHINE

INTRODUCTION

Rotary electric machines deliver torque to a coupled load in a wide variety of electromechanical systems. In a typical radial flux-type electric machine, for instance, a rotor is circumscribed by a stator. The rotor and an integrally-connected rotor shaft rotate together in unison when the stator's field windings are sequentially energized by a high-voltage power supply, typically a power inverter module and a multi-cell battery pack. Torque that is generated by such machine rotation is transmitted to the coupled load to perform work, e.g., generating electricity, cranking and starting an internal combustion engine, or powering road wheels, propeller blades, drive belts, or other driven loads depending on the application.

In a permanent magnet (PM) machine, strong permanent magnets are surface-mounted to or embedded within individual ferrous laminations of the rotor. The permanent magnets are arranged to form alternating magnetic north and south poles around the rotor's circumference. The rotating stator field interacts with the strong magnetic fields of the permanent magnets to impart rotational forces to the rotor shaft. External control of an input voltage to the stator windings ultimately controls the speed and output torque produced by the PM machine. An energized PM machine generates a back-electromotive force (back-EMF) that opposes a voltage of the energized stator windings. Therefore, field weakening techniques are often used at higher rotational speeds to reduce the magnitude of the back-EMF. In contrast to a PM machine, a variable flux machine (VFM) enjoys the capability of changing the level of magnetic flux during operation. A VFM is thus able to provide a relatively high output torque at higher energy efficiency levels, while PM machines tend to experience higher energy losses under high-speed/low-load operating conditions.

Magnetic flux may be varied within flux paths of a rotary electric machine to vary the back-EMF of the electric machine, for instance by using machine demagnetization or magnetization, mechanical flux-shunting elements, or the above-noted field weakening techniques. A typical VFM may change a position or angle (shunt angle) of hardware devices embedded within the electric machine to impart a purposeful change of direction in the magnetic flux passing through a magnetic field circuit or shunt field. Field weakening techniques when used in VFM or pure PM machines have the ultimate effect of reducing the stator field current and back-EMF of the electric machine.

SUMMARY

Disclosed herein are control systems, associated control logic, and methods for controlling a transient response of a rotary electric machine using open-loop/feed-forward control strategies. The solutions described herein are intended to improve overall speed and accuracy of the torque transient response in a variable flux machine (VFM), with the present teachings being readily extendable to the real-time control and thermal regulation of a permanent magnet (PM) machine using simple temperature-based parameter substitutions as described herein.

As will be appreciated by those of ordinary skill in the art, a computer-controlled dynamical system such as a rotary electric machine will, in the course of its ongoing operation, exhibit separate steady-state and transient operating periods. For instance, output torque produced by a propulsion traction motor that is supplied with a constant voltage at a constant operating temperature will eventually produce a relatively predictable steady-state torque. A steady-state torque response of a given electric machine is usually made available within a control system as a set of torque-speed curves. The steady-state torque response of the electric machine may be relied upon by associated motor control processors, hierarchical controllers, and associated control logic to power a driven load in a predictable and repeatable manner.

In contrast to the steady-state torque response, the transient torque response of an electric machine is the machine's unique time-variant response to one or more changed input conditions prior to or subsequent to steady-state operation. Relatively slow and/or large torque transients can exacerbate noise, vibration, and harshness ("NVH") effects. For instance, an overly abrupt torque transient response in a motor vehicle having an electric powertrain driven by an electric traction motor may be perceived as an undesirable torque disturbance, and thus as a degraded drive quality. The present open-loop control strategies thus seek to optimize the speed and accuracy of a torque transient response of rotary electric machines in maximum torque-per-ampere (MTPA) and field weakening (FW) control regions, including applications benefiting VFM and PM machine embodiments.

An exemplary embodiment of a method for controlling transient operation of a VFM includes, during a shunt angle transition of the VFM, receiving a commanded shunt angle of the VFM and a measured shunt angle of the VFM during operation of the VFM in a predetermined control region. The method also includes calculating, via a controller, a d-axis delta current ($\Delta I_d$) term and a q-axis delta current ($\Delta I_q$) term required to maintain an output torque level of the VFM through a duration of the shunt angle transition, and then applying the required $\Delta I_d$ term and the required $\Delta I_d$ term as feed-forward terms. This has the effect of respectively adjusting a d-axis current ($I_d$) term and a q-axis current ($I_q$) term from a respective lookup table, thereby maintaining the output torque level of the VFM during the shunt angle transition.

The predetermined control region may be maximum torque per ampere (MTPA) operating region or a field weakening (FW) control region.

The method may also includes receiving a commanded torque of the VFM during the FW control region, determining a steady-state delta current ($\Delta I_{ss}$) term from a direct current bus voltage and a rotational speed of the VFM, and adjusting the $I_d$ term and the q term using the commanded torque and the $\Delta I_{ss}$ term prior to applying the feed-forward terms.

In some embodiments, determining the $\Delta I_{ss}$ term includes multiplying a modulation index command by a current electrical rotational speed of the VFM to derive a modulated value, and then feeding the modulated value through a proportional-integral block to derive the $\Delta I_{ss}$ term.

Calculating the d$\Delta I_d$ term and the $\Delta I_q$ term may include processing the commanded shunt angle, the measured shunt angle, a commanded d-axis current, and a commanded q-axis current through one or more average inductance lookup tables to thereby determine an average d-axis inductance and an average q-axis inductance associated with the measured shunt angle and the commanded shunt angle, respectively.

The method may include providing a direct current bus voltage, a torque slew command, and a rotary speed of the VFM into the separate d-axis and q-axis current command lookup tables, and determining the $I_d$ term and the $I_q$ term via the separate d-axis and q-axis current command lookup tables using the direct current bus voltage, the torque slew command, and the rotary speed.

A torque control loop having a torque command calculation block and a torque estimate block may be used in some embodiments of the method. The torque command calculation block may determine a commanded torque from the commanded shunt angle, a commanded d-axis current, and a commanded q-axis current. The torque estimate block may determine an estimated torque from the measured shunt angle, the commanded d-axis current, and the commanded q-axis current. The commanded d-axis and q-axis currents are the adjusted $I_d$ term and the adjusted $I_q$ term, respectively.

An electric powertrain is also disclosed herein. In an exemplary embodiment, the electric powertrain includes a VFM, a traction power inverter module (TPIM) connected to the VFM, and a controller in communication with the VFM and the TPIM. The controller is configured to execute the method noted above.

Another embodiment of the method is adapted for controlling transient operation of a permanent magnet (PM) machine. During operation of the PM machine in the MTPA control region, this method includes receiving a commanded temperature and a measured temperature of the PM, and then calculating, via a controller using the commanded temperature, the measured temperature, a commanded d-axis current, and a commanded q-axis current, a d-axis delta current ($\Delta I_d$) term and a q-axis delta current ($\Delta I_q$) term required to maintain an output torque level of the electric machine through a change of temperature of the PM machine in the MTPA region.

The method may include providing a direct current bus voltage, a torque slew command, and a rotary speed of the PM into separate d-axis and q-axis current command lookup tables, as well as determining the $I_d$ term and the $I_q$ term via the separate d-axis and q-axis current command lookup tables using the direct current bus voltage, the torque slew command, and the rotary speed. The required $\Delta I_d$ term and the required $\Delta I_q$ term are then applied as feed-forward terms to respectively adjust the $I_d$ term and the $I_q$ term, thereby maintaining the output torque level of the VFM during the shunt angle transition.

The above-noted and other features and advantages of the present disclosure will be readily apparent from the following detailed description of the embodiments and best modes for carrying out the disclosure when taken in connection with the accompanying drawings and appended claims.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof.

Figure 1:
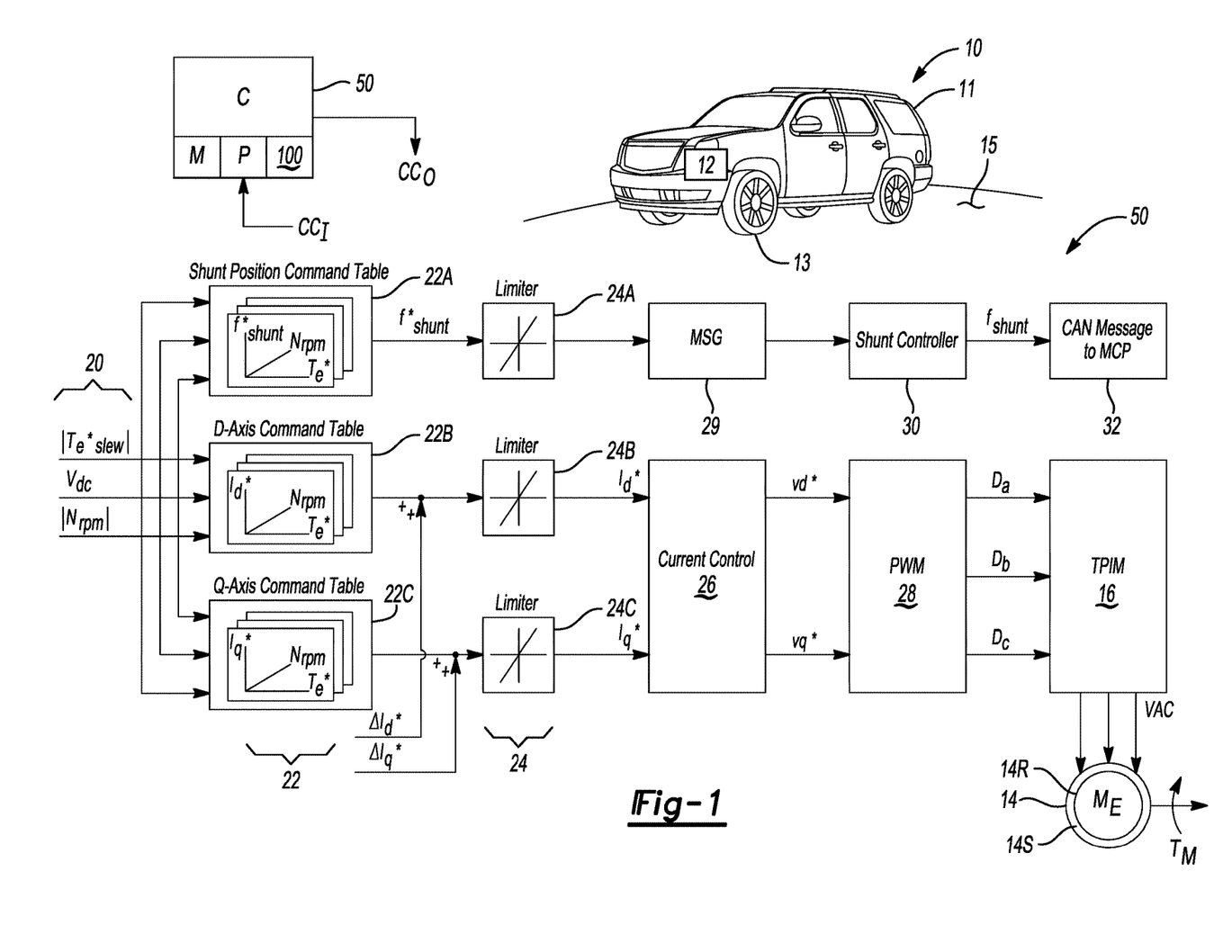
FIG. 1 is a schematic illustration of an exemplary motor vehicle having an electric powertrain with a rotary electric machine and a control system configured as set forth herein, with FIG. 1 depicting steady-state operation.

Referring to the drawings, wherein like reference numbers refer to like components, FIG. 1 schematically depicts a motor vehicle 10 in a steady-state control region, with the motor vehicle 10 having a vehicle body 11, an electric powertrain 12, and one or more road wheels 13 in rolling contact with a road surface 15. Although omitted for the purpose of illustrative simplicity, the electric powertrain 12 also includes an onboard power supply, such as a high-voltage direct current battery pack having an application-suitable number of high-energy rechargeable battery cells, for instance lithium ion battery cells or cells constructed of another suitable battery chemistry.

A battery pack of this type is discharged in a controlled manner in order to energize phase windings of a rotary electric machine ($M_E$) 14, which in turn may be embodied as a variable flux machine (VFM) or a permanent magnet (PM) machine in accordance with the representative embodiments described herein with reference to FIGS. 2-8. The electric machine 14 may be optionally configured as an electric traction motor for use as a primary torque source in the electric powertrain 12, with the electric machine 14 in such a configuration being operable for generating motor torque (arrow $T_M$) at levels sufficient for propelling the motor vehicle 10 or as an electrical generator for recharging the above-noted battery pack.

The motor vehicle 10 of FIG. 1 may also include additional torque sources not specifically described herein, for instance an internal combustion engine and/or additional electric machines 14, and therefore the representative embodiment of FIG. 1 is intended to be illustrative of the present teachings and non-limiting. Beneficial applications of the electric machine 14 are not limited to mobile applications in general or to vehicular propulsion applications in particular. Those of ordinary skill in the art will appreciate that the attendant benefits of the disclosed electric machine 14, when controlled using the strategies described below with reference to the remaining Figures, may be extended to stationary and mobile applications that rely on the use of motor torque (arrow $T_M$), e.g., watercraft, aircraft, rail vehicles, mobile platforms, robots, powerplants, washing machines or other appliances, or other stationary or mobile systems.

The electric machine 14 may include a concentrically-arranged rotor 14R and stator 14S of the types noted generally above. A magnetic circuit therefore exists in laminated structure of the rotor 14R and stator 14S, across a small air gap (not shown) between the rotor 14R and stator 14S, and possibly across small air pockets defined by the rotor 14R. Flux paths within such a magnetic circuit are varied in certain constructions of the electric machine 14, e.g., the VFM, such as by selectively shunting magnetic flux in a targeted manner at specific operating points of the electric machine 14 by moving or skewing phasing mechanisms or using other shunting elements. Passively-controlled or actively-controlled skewing operations increase or decrease torque capabilities of the electric machine 14, as will be appreciated by those of ordinary skill in the art and as described generally above. Thus, commanded shunt angle is a particular control variable that may be relied upon in the operational control of the electric machine 14. Such a control unit represented schematically in FIG. 1 as a controller (C) 50.

The controller 50 in conjunction with the TPIM 16 shown in FIG. 1 may be used to regulate ongoing transient and steady-state operation of the electric machine 14 in response to input signals (arrow $CC_I$), with the controller 50 doing so via wired or wireless transmission of control signals (arrow $CC_O$) to the electric machine 14 and/or associated logic blocks thereof, as set forth herein and illustrated in FIGS. 2-8. For example, the controller 50 may monitor the rotational speed, temperature, and torque of the electric machine 14 using corresponding sensors (not shown), modeling, and/or calculations, and may selectively transition to a flux weakening (FW) control mode from a maximum torque per ampere (MTPA) mode at certain torque-speed operating points or as otherwise needed.

The controller 50 may be physically embodied as one or more electronic control units or computer nodes each having the requisite memory (M) and a processor (P), as well as other associated hardware and software, e.g., a clock or timer, input/output circuitry, buffer circuitry, etc. Memory (M) may include sufficient amounts of read only memory, for instance magnetic or optical memory. Instructions embodying a control method may be programmed as computer-readable instructions 100 into the memory (M) and executed by the processor(s) (P) during operation of the vehicle 10 to thereby optimize operating efficiency to implement control strategies using the various embodiments of FIGS. 2-8. The term "controller" is used herein for simplicity, and includes control modules, units, processors, and permutations thereof, including logic circuits, Application Specific Integrated Circuits (ASICs), electronic circuits, central processing units, microprocessors, and other hardware as needed to provide the programmed functionality set forth below.

Still referring to FIG. 1, core hardware and programmed memory elements of the controller 50 are used, as noted generally hereinabove, to control steady-state operation of the electric machine 14 as well as to regulate operation of the electric machine 14 during a transient response. For instance, the schematically-depicted control logic of FIG. 1 may be used during steady-state operation of an optional VFM embodiment of the electric machine 14.

As part of the input signals (arrow $CC_I$), for instance, the controller 50 may receive a set of motor control inputs 20, shown as a motor torque slew command, $|T_e^*\text{slew}|$, with the slew rate defined herein as a commanded rate of change per unit time of motor torque commands. The motor control inputs 20 also include the current DC bus voltage ($V_{DC}$) feeding a traction power inverter module (TPIM) 16 of the electric powertrain 12 and the rotary electric machine 14, and an absolute measured or actual/reported speed $|N_{rpm}|$ of the rotor 14R.

The motor control inputs 20 are fed into calibrated lookup tables 22, i.e., lookup tables 22A, 22B. and 22C, each of which is programmed into or accessible by the controller 50 and indexed by the motor control inputs 20. In the illustrated embodiment, the lookup table 22A ("Shunt Position Command Table") provides a corresponding shunt angle command ($f^*_{shunt}$), lookup table 22B ("D-Axis Command Table") provides a corresponding direct-axis (d-axis) current command ($I_d^*$), and lookup table 22C ("Q-Axis Command Table") provides a corresponding quadrature-axis (q-axis) command ($I_q^*$). Such lookup tables 22A, 22B, and 22C may be indexed by commanded motor/electric torque ($T_e^*$) as shown.

Still referring to FIG. 1, the output values from the lookup tables 22B and 22C may be added to respective d-axis and q-axis control terms, referred to herein as "delta current command" values $\Delta I_d^*$ and $\Delta I_q^*$, with the asterisk superscript (*) indicating a commanded value. The $\Delta I_d^*$ and $\Delta I_q^*$ values may be rate-limited to within a calibrated allowable maximum/minimum slew rate using a corresponding limit block 24, e.g., limit blocks 24A, 24B, or 24C. The corrected and rate-limited d-axis and q-axis current commands $I_d^*$ and $I_q^*$ are then fed into a current control block 26 ("Current Control"), referred to in the art as a "current controller", with the current control block 26 being configured to convert the d-axis and q-axis current commands $I_d^*$ and $I_q^*$ into corresponding d-axis and q-axis voltage commands $v_d^*$ and $v_q^*$, respectively.

The d-axis and q-axis voltage commands $v_d^*$ and $v_q^*$ output by the current control block 26 are thereafter used by the controller 50 in a modulation process, e.g., by feeding the d-axis and q-axis voltage commands $v_d^*$ and $v_q^*$ into a PWM control block ("PWM") 28, which in turn outputs a, b, and c phase switching commands (Da, Db, Dc) to the TPIM 16, as will be appreciated by those of ordinary skill in the art. In response, the TPIM 16 controls the ON/OFF states of semiconductor switches (not shown) housed in switching dies therein, with the TPIM 16 thereafter outputting a polyphase voltage (VAC) to the stator 14S to cause rotation of the rotor 14R, and to thereby power the road wheels 13.

In the exemplary steady-state control logic depicted in FIG. 1, a rate-limited shunt position command ($f^*_{shunt}$) from limit block 24A may be fed into a messaging block ("MSG") 29. For example, the controller 50 may receive and transmit data messages aboard the motor vehicle 10 using a controller area network (CAN) bus using a suitable protocol. Messaging block 29 may be configured to convert the CAN messages into suitable transmission control commands as needed. Corresponding control signals are then provided to a shunt control block ("Shunt Controller") 30, i.e., a logic block and associated hardware configured to adjust the shunt angle of shunt elements (not shown) used within the flux paths of the electric machine 14.

The shunt control block 30 is also configured to measure and report an actual shunt position ($f_{shunt}$), e.g., using an angular encoder or other suitable position sensor. The actual shunt position is relayed to the rotary electric machine 14 by a communications relay block 32, e.g., to a motor control processor or MCP residing within the electric machine 14, for instance as a CAN message ("CAN Message to MCP"). As will be appreciated by those of ordinary skill in the art, the shunt control block 30 may reside within the same control unit as the rest of the logic, in which case there is no need for the above-described CAN messaging.

FIGS. 2-8 depict open-loop control schemes usable in addition to the steady-state control of FIG. 1 to improve the transient response of the rotary electric machine 14. In general, the various control options provide feed-forward control schemes in which decoupled $\Delta I_d$ and $\Delta I_q$ terms are calculated online/in real-time during a shunt angle transition of the rotor 14R. Thus, the present approaches do not require calibration or tuning. Likewise, the solutions set forth below do not result in large torque transients when operating in the flux weakening (FW) region of control.

In the various embodiments, torque commands are estimated through current and shunt angle commands, instead of using a direct torque command as a control input. Current commands are also updated based on a measure shunt angle as described below. Some embodiments retain feedback control elements, e.g., the combined embodiments of FIGS. 6-8, while the various embodiments collectively provide open-loop configurations usable as part of the representative motor vehicle 10 of FIG. 1 or other systems having the electric powertrain 12 and/or the rotary electric machine 14.

Figure 2:
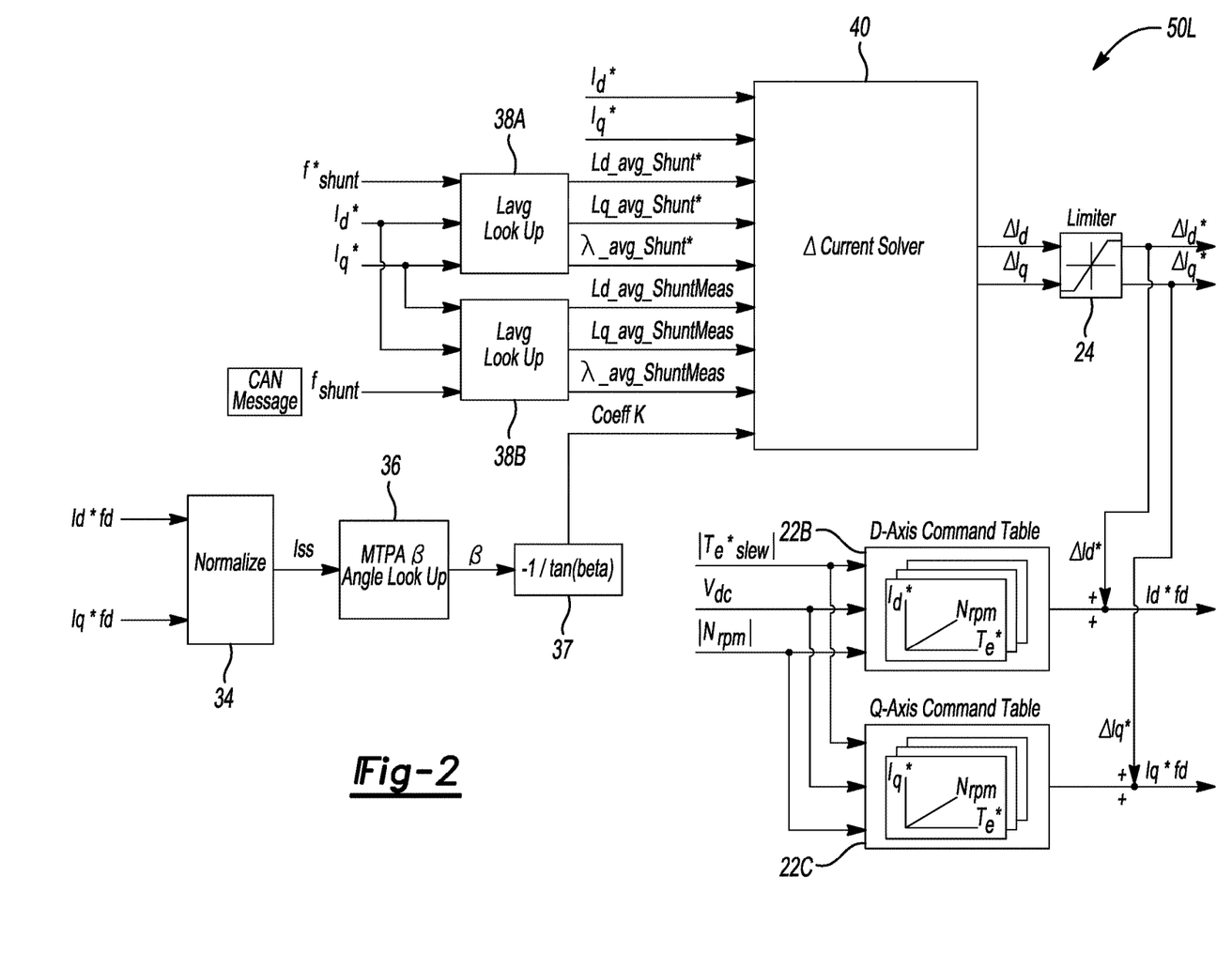
FIG. 2 is a schematic open-loop control logic diagram providing transient torque control of a variable flux machine (VFM) when operating the VFM in a maximum torque per ampere (MTPA) control region.

Referring to FIG. 2, the schematically-depicted open-loop control logic 50L may be used to control a transient response of the rotary electric machine 14 of FIG. 1 when the electric machine 14 is embodied as a VFM, and in particular during operation of a VFM embodiment of the electric machine 14 operating in an MTPA control region. As will be appreciated by those of ordinary skill in the art, resistive losses occurring within the stator 14S of FIG. 1 depend on the magnitudes of the phase currents being fed into the individual stator windings. Thus, operation of the electric machine 14 in the MTPA control region strives to maximize output torque (arrow $T_M$) of the electric machine 14 at a given current magnitude. As the shunt angle changes, so too will the back-EMF in the electric machine 14, which in turn causes a change to occur in the output torque (arrow $T_M$ of FIG. 1). The control logic 50L of FIG. 2, when used in the MTPA region of control, may therefore help expedite the overall transient response time and smooth possible torque disturbances.

The open-loop control logic 50L includes a normalization block 34 ("Normalize") configured to receive the d-axis and q-axis current feedback commands $I_d^*fd$ and $I_q^*fd$, which are the same actual d-axis and q-axis current commands shown at far right in FIG. 2. The normalization block 34, as the name implies, normalizes the d-axis and q-axis current commands to output a resultant steady-state current (Iss). A lookup table 36 ("MTPA p Angle Look Up") may be referenced using the steady-state current (Iss), with a corresponding magnetic flux angle ($\beta$) output from lookup table 36 and processed via a functional block 37

$$\left("-\frac{1}{\tan(\beta)}"\right)$$

to determine a coefficient value ("Coeff").

The open-loop control logic 50L of FIG. 2 is also configured to receive the above-described commanded shunt angle ($f^*_{shunt}$), the commanded d-axis current ($I_d^*$), and the commanded q-axis current ($I_q^*$), and a measured/actual shunt angle ($f_{shunt}$), e.g., as a CAN message. Lookup tables 38A and 38B ("Average Inductance Look Up") receive the commanded d-axis and q-axis currents $I_d^*$ and $I_q^*$ along with either the commanded shunt angle (lookup table 38A) and the actual shunt angle (lookup table 38B).

The lookup tables 38A and 38B together allow the controller 50 of FIG. 1 to determine the corresponding d-axis and q-axis average inductance contributions from the commanded shunt angle (lookup table 38A), i.e., $L_{d\_avg\_Shunt}^*$ and $L_{q\_avg\_Shunt}^*$, and from the actual/measured shunt angle (lookup table 38B), i.e., $L_{d\_avg\_ShuntMeas}$ and $L_{q\_avg\_ShuntMeas}$. Likewise, the lookup tables 38A and 38B respectively provide average magnetic flux contributions $\lambda_{\_avg\_Shunt}^*$ and $\lambda_{\_avg\_ShuntMeas}$.

The controller 50 also includes a delta current solver logic block 40 ("Delta Current Solver") configured to receive the various inputs from functional block 37 and the lookup tables 38A and 38B, and to output the corresponding d-axis and q-axis current delta values $\Delta I_d$ and $\Delta I_q$. In turn, $\Delta I_d$ and $\Delta I_q$ are processed through a limiter block 24 to generate the corresponding d-axis and q-axis current delta commands $\Delta I_d^*$ and $\Delta I_q^*$, used downstream of the d-axis and q-axis command tables 22B and 22C shown in FIG. 1 and described above.

The magnetic flux of the electric machine 14 will change during a shunt angle transition, and thus causes torque error during the transition. However, it is recognized herein that each shunt angle will have a unique current command that, if applied, will cause the generated torque to match the torque command, thereby eliminating the torque error. The controller 50 of FIG. 1 therefore calculates the delta currents required at each respective shunt angle to maintain torque levels output by the electric machine 14 through the shunt angle transition.

To that end, and assuming $\Delta I_q = K \Delta I_d$, with K being calculated by block 37, the controller 50 of FIG. 1 may automatically set a commanded torque (T) equal to an adjusted torque, i.e.:

$$T^* = \frac{3}{2}\frac{P}{2}[(L_d(St^*, I_d^*, I_q^*)I_d^* + \lambda_f(St^*))I_q^* - L_q(St^*, I_d^*, I_q^*)I_q^*I_d^*] =$$
$$\frac{3}{2}\frac{P}{2}[(L_d(St, I_d^* + \Delta I_d, I_q^* + \Delta I_q)(I_d^* + \Delta I_d) + \lambda_f(St))(I_q^* + K\Delta I_d) -$$
$$L_q(St, I_d^* + \Delta I_d, I_q^* + \Delta I_q)(I_q^* + K\Delta I_d)(I_d^* + \Delta I_d)]$$

where P is the number of magnetic poles of the electric machine 14, St is the shunt angle, $\lambda_f$ is the motor flux, and L is inductance, and retaining the d-axis and q-axis subscripts.

Figure 3:
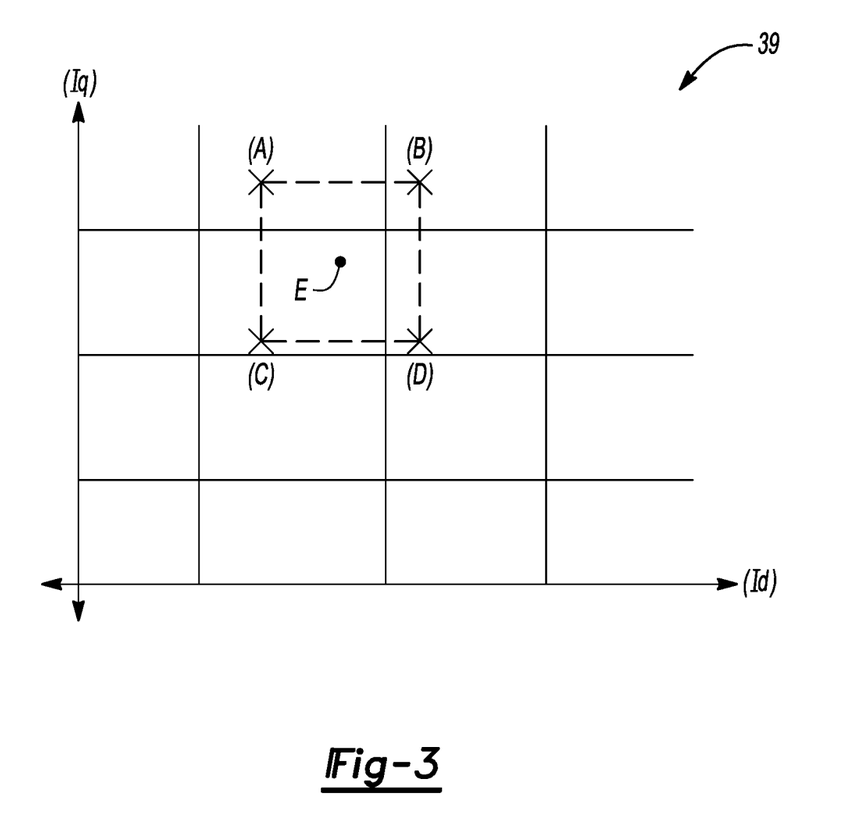
FIG. 3 is a schematic plot of an example inductance table referenced or indexed by d-axis and q-axis currents and used as part of the logic of FIG. 2.

Assuming that an inductance change due to a current change is small, the average inductance for the q-axis and d-axis can be estimated as part of the control logic 50L. An exemplary inductance lookup table may be used for this purpose to produce a result as shown at 39 in FIG. 3. That is, for a given $I_d$ and $I_q$ pair such a table may have a corresponding $L_d$ and $L_q$ value. As open-loop control is being used in the control circuit 50L, the direction of current change is not known ahead of time, and therefore the average inductances may be derived using adjacent four currents (A), (B), (C), and (D) as shown in FIG. 3. Essentially, the controller 50 searches around the existing $I_d$ and $I_q$ current pair (E) to find the adjacent four currents (A)-(D), then calculates the average inductance contributions for the q-axis and d-axis, i.e., Ld(avg) and Lq(avg) in block 38A and 38B.

These values may then be used to reduce the pertinent portions of the above equations as follows:

$$[(L_d(St^*, I_d^*, I_q^*)I_d^* + \lambda_f(St^*))I_q^* - L_q(St^*, I_d^*, I_q^*)$$
$$I_q^* I_d^*] = [(L_d(avg)(I_{dq}^* + \Delta I_d) + \lambda_f(St))(I_q^* + K\Delta I_d) -$$
$$L_q(avg)(I_q^* + K\Delta I_d)(I_d^* + \Delta I_d)].$$

Thus, the controller 50 can solve the resulting second-order equation to find different solutions for $I_d$, $I_q$, and $I_{ss}$, with the controller 50 conservatively picking the smaller of the two solutions in implementing the control logic 50L for optimal efficiency.

Figure 4:
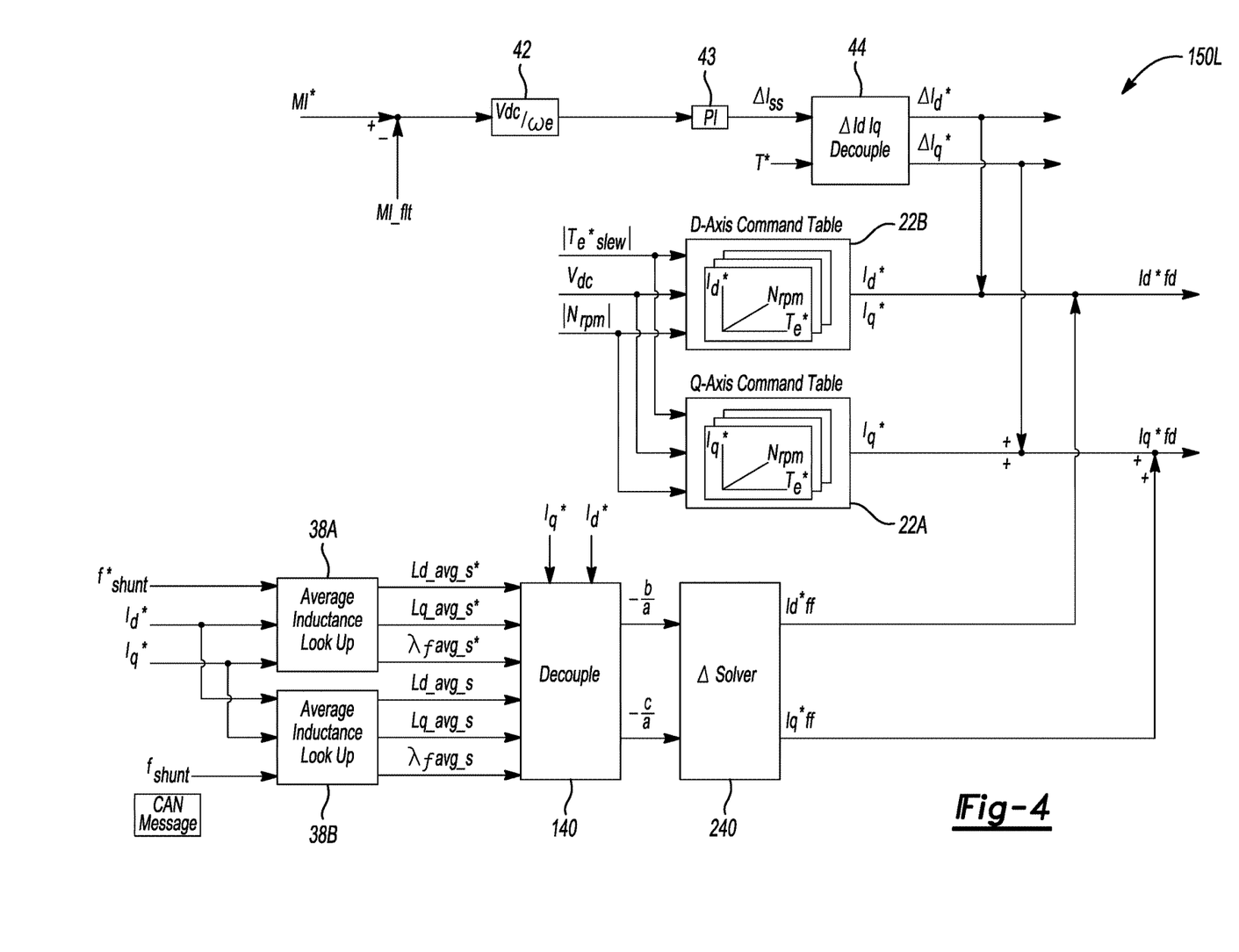
FIG. 4 is schematic open-loop control logic diagram of transient torque control of an exemplary VFM when operating in a field weakening (FW) control region.

FIG. 4 depicts alternative control logic 150L for providing transient torque control in the field weakening (FW) region. As will be appreciated, control logic 50L of FIG. 2 and control logic 150L are not mutually exclusive, but rather are selectively employed during MTPA operation (control logic 50L) or FW operation (control logic 150L). In the FW control embodiment of FIG. 4, the controller 50 uses additional field weakening logic and a modified version of the logic block 40 shown in FIG. 2, i.e., as logic blocks 140 and 240 as described below.

The control loop 150L is configured to receive a modulation index command (MI*), which may be adjusted using a filtered modulation index signal (MI_filt) as shown. As used herein, a modulation index is a ratio of the terminal voltage command of the electric machine 14 divided by the commanded voltage (six-step voltage). Block 42 multiplies this value by the current electrical rotational speed divided by the DC bus voltage, i.e., Vdc/$\omega_e$, and feeds the product through a proportional-integral (PI) block 43 to derive the steady-state delta current ($\Delta$Iss).

The steady-state delta current ($\Delta$Iss) and a torque command T*, e.g., from the controller 50 or another control unit, are fed into a control block 44 which outputs separate/decoupled d-axis and q-axis delta currents, i.e., $\Delta I_d$ and $\Delta I_q$, which are then used as set forth above downstream of the lookup tables 22B and 22A described above with reference to FIGS. 1 and 2 to maintain the modulation index as the commanded value. Dual-loop control is thus utilized in the field weakening control region in which the control logic 150L regulates the d-axis and q-axis currents.

Inputs to logic block 140 ("Decouple") are the same as those used as inputs to lookup table block 40 of FIG. 2. However, logic block 140 decouples the d-axis and q-axis delta currents $\Delta$Id and $\Delta$Iq in a particular manner by outputting values $$-\frac{b}{a} \text{ and } -\frac{c}{a}$$

to a functional block 240. Instead of following MTPA trendline as in FIG. 2, operation in the field weakening region must follow the voltage ellipse, as will be appreciated by those skilled in the art. Thus, assuming $(L_{d,avg}(St) - L_{q,avg}(St))\Delta I_d \Delta I_q$ is negligible, the following simplified equations are valid for the field weakening region:

$$a\Delta I_q + b\Delta I_d + c = 0$$

$$\Delta I_q = -\frac{b\Delta I_d + c}{a}$$

It follows that the governing equations can be rewritten as a second order equation:

$$k_1 \Delta I_d^2 + k_2 \Delta I_d + k_3 = 0.$$

Thus, the values a, b, and may be derived by logic block 140, output as the indicated ratios to feed into block 240, and thereafter used by logic block 240 ("$\Delta$ Solver") to calculate the feed-forward values $I^*_{d\_ff}$ and $I^*_{q\_ff}$, which are thereafter used to determine the final d-axis and q-axis current commands $I_d^*$ fd and $I_q^*$fd. In solving for $I_d$, the second order equation will produce two solutions, and thus two solutions for $I_q$ and for $I_{ss}$. For optimal efficiency the controller 50 may therefore select the smaller of the two $I_{ss}$ solutions.

Figure 5:
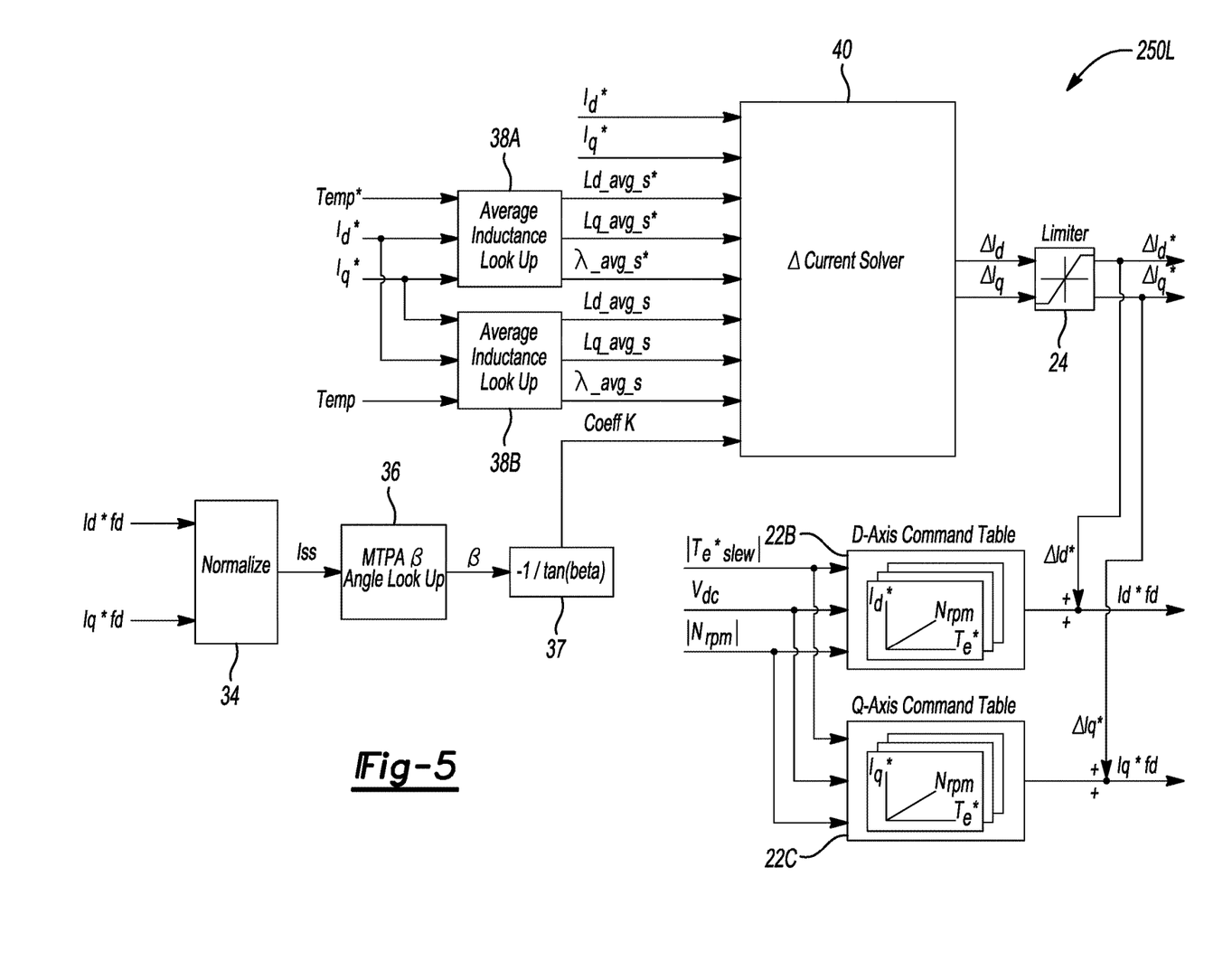
FIG. 5 is a schematic open-loop control logic diagram providing an alternative embodiment to that which is shown in FIG. 2, and providing for thermal adaption during control of a permanent magnet (PM) machine in the MTPA control region.

Referring to FIG. 5, the control strategy whose flow is schematically illustrated in FIG. 2 may also be optionally tailored for use with a PM machine embodiment of the electric machine 14 using optional control logic 250L. Relative to the control logic 50L of FIG. 2, respective commanded and estimated/actual magnet temperature values (Temp* and Temp) are substituted for the respective commanded and actual shunt position values ($f^*_{shunt}$ and $f_{shunt}$) of FIG. 2. FIGS. 2 and 4 are otherwise identical in both structure and operation.

Using the VFM example, when the shunt angle changes, the motor back-EMF will also change, and the corresponding motor torque will be adjusted based on the actual shunt angle. The proposed control methodology therefore adjusts the current commands so that the torque produced by the electric machine 14 is maintained even as the actual shunt angle is changing. For a PM machine, changes in motor temperature result in changes to the motor back-EMF. The corresponding motor torque will likewise change under the same current command condition. With the proposed control scheme of FIG. 4, the motor output torque $T_M$ of FIG. 1 is maintained regardless of the motor temperature change. In this way, the present approach is adaptive in real time to thermal changes in the PM machine.

Figure 6:
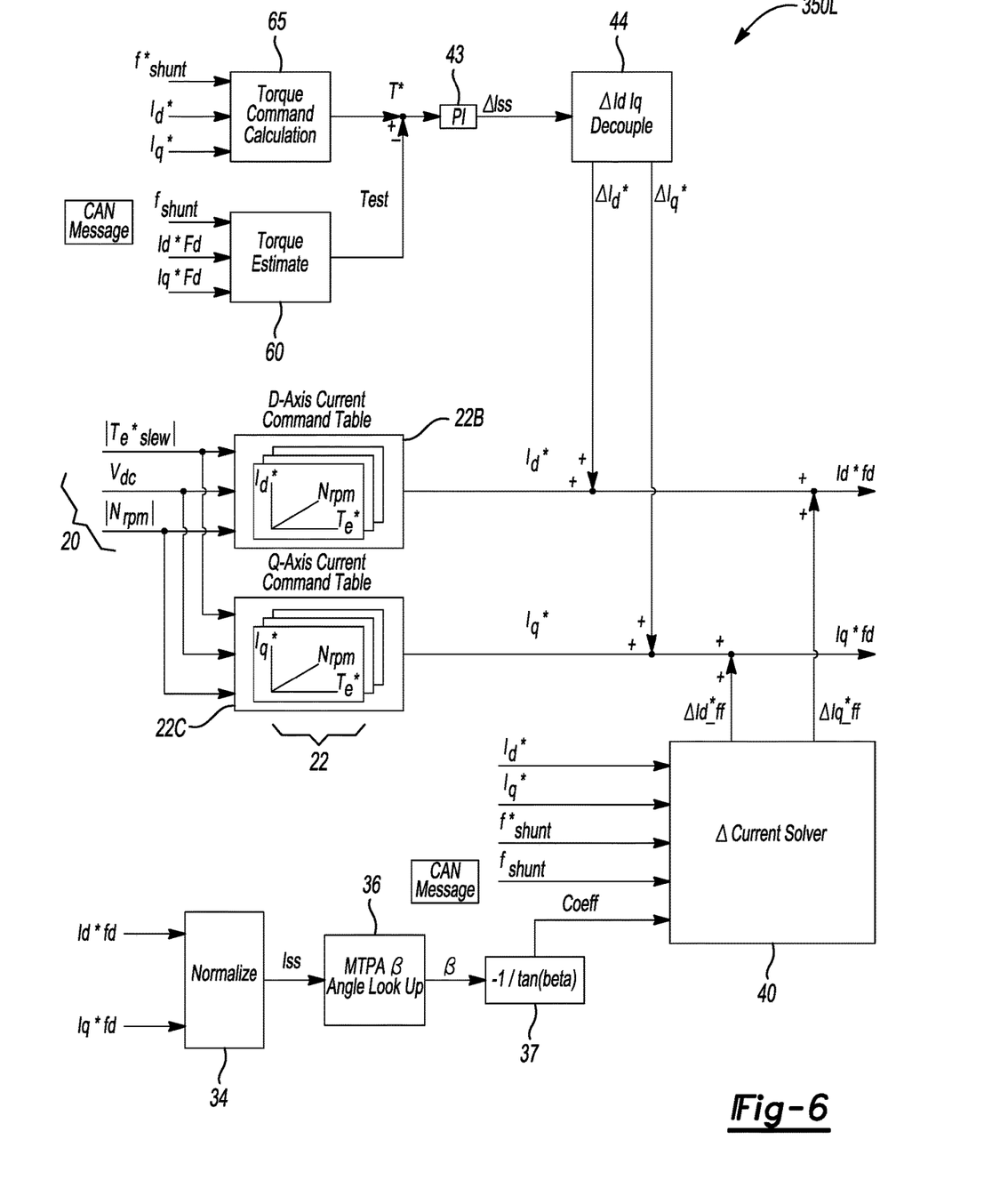
FIGS. 6 and 7 are schematic control logic diagrams of combined open-loop/closed-loop control logic ("hybrid logic") embodiments for a VFM operating in the MTPA and FW control regions, respectively.
Figure 7:
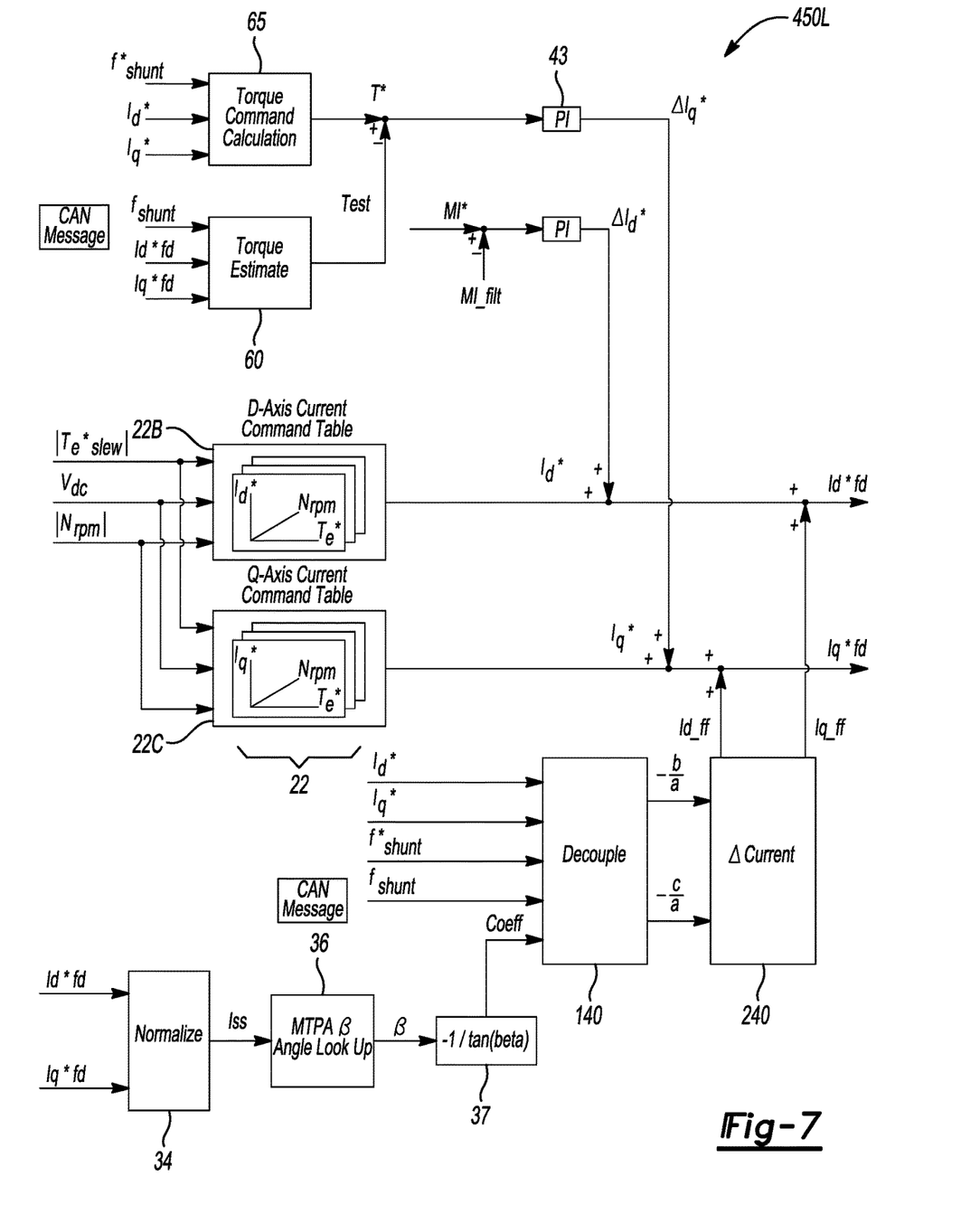
Figure 8:
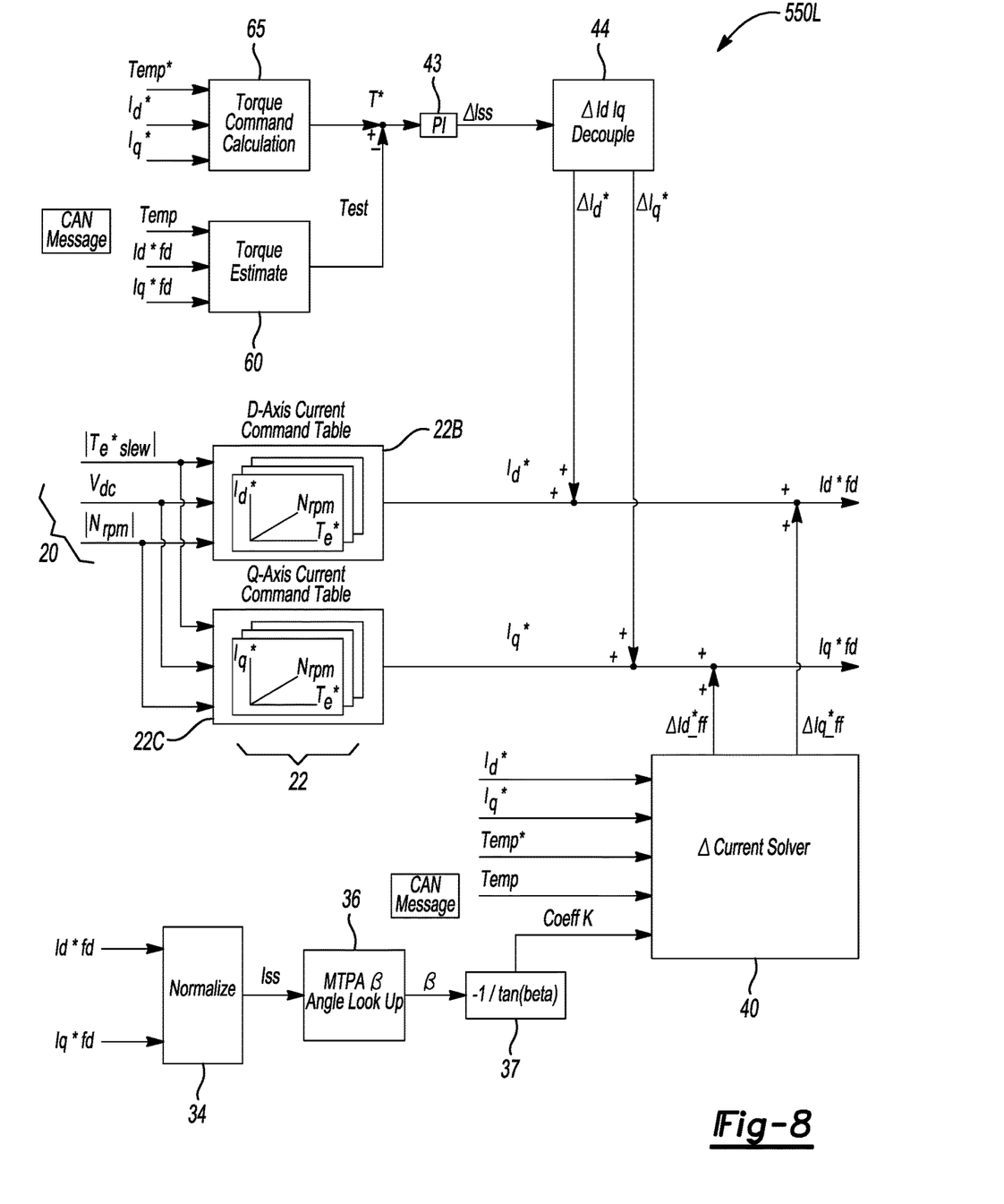
FIG. 8 is a schematic hybrid control logic diagram providing optional thermal adaption for use when controlling a PM machine in the MTPA control region.

FIGS. 6-8 illustrate hybrid embodiments in which the above-described open-loop control schemes are combined to some extent with closed-loop control schemes to provide additional benefits, with control logic 350L of FIG. 6 providing for transient torque control in the MTPA region, control logic 450L of FIG. 7 providing for transient torque control in the field weakening region, and control logic 550L of FIG. 8 providing for thermal adaptation to PM machine implementations.

The control logic 350L of FIG. 6, for instance, is analogous to control logic 50L of FIG. 2, with the addition of logic blocks 60 ("Torque Estimate") and 65 ("Torque Command Calculation"). Both logic blocks 60 and 65 may be implementation as lookup tables in a simplified embodiment, with logic block 60 outputting an estimated torque ($T_{est}$) and logic block 65 outputting a commanded torque (T*). Control thus proceeds as set forth above for the control logic 50L of FIG. 2, with the commanded d-axis and q-axis currents $I_d^*$fd and $I_q^*$fd being fed back into logic block 60 as closed-loop feedback terms. Here, block 40 is simplified in is depiction, but includes prior-described blocks 38A and 38B. Closed-loop control is achieved in control logic 350L through operation of blocks 60, 65, 43, and 44 shown at the top of FIG. 6, with feedback terms being $Id^*_{fd}$ and $Iq^*_{fd}$.

Likewise, the alternative control logic 450L of FIG. 7 may be used for field weakening purposes in a manner analogous to operation of the control logic 150L shown in FIG. 4, with the variation of the added logic blocks 60 and 65, and the added variation of the use of the respective commanded d-axis and q-axis currents $I_d$*fd and $I_q$*fd being used as closed-loop feedback terms to block 60. For illustrative simplicity, lookup tables 38A and 38B and their various inductance outputs are combined in block 140 in FIG. 7. However, in an actual implementation of FIG. 7 the logic block 140 may receive the various inductance and flux values from tables 38A and 38B of FIGS. 2 and 4 in lieu of the commanded and actual shunt angles $f_{shunt}$* and $f_{shunt}$.

In the same vein, the control logic 550L of FIG. 8 is analogous to control logic 250L of FIG. 5, and may be used in the same way for thermal adaption of a PM embodiment of the electric machine 14. Additionally, the delta current solver 40 is a combination of blocks 38A, 38B, and 40 in FIGS. 5-8, retaining the d-axis and q-axis commands $I_d$ and $I_q$*, and the coefficient K from block 37, and adding to this the commanded temperature (Temp) and the estimated/actual temperature (Temp).

As will be appreciated by those of ordinary skill in the art in view of the foregoing disclosure, the present approach contemplates an open-loop based rapid estimation of commanded torque for the rotary electric machine 14 of FIG. 1 during shunt angle transitions, with the approach based on current and shunt angle commands. The present approach adjusts the d-axis and q-axis current commands to the electric machine 14 based on the commanded and actual shunt angle, with estimated torque from the electric machine 14 likewise provided through the shunt angle and d-axis/q-axis current commands.

The various solutions set forth above seek to maintain a smooth torque transient response and torque accuracy during shunt angle transitions occurring within VFM embodiments of the electric machine 14 in the presence of torque error, with aspects of the present disclosure readily extendable to thermal adaption for PM machine variants. These and other benefits will be readily appreciated by those of ordinary skill in the art in view of the forgoing disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A method for controlling transient operation of a variable flux machine (VFM), the method comprising:
   during a shunt angle transition of the VFM, receiving a commanded shunt angle of the VFM and a measured shunt angle of the VFM during operation of the VFM in a predetermined control region, the shunt angle transition occurring while shunting hardware elements embedded within the VFM to impart a change in direction of magnetic flux transition from a first position to a second position;
   calculating, via a controller, a d-axis delta current (ΔId) term and a q-axis delta current (ΔIq) term required to maintain an output torque level of the VFM through a duration of the shunt angle transition; and
   applying the required ΔId term and the required ΔId term as feed-forward terms to respectively adjust a d-axis current (Id) term and a q-axis current (Iq) term from a respective lookup table, and to thereby maintain the output torque level of the VFM during the shunt angle transition.

2. The method of claim 1, wherein the predetermined control region is a maximum torque per ampere (MTPA) operating region.

3. The method of claim 1, wherein the predetermined control region is a field weakening (FW) control region.

4. The method of claim 3, further comprising:
   receiving a commanded torque of the VFM during the FW control region;
   determining a steady-state delta current (Diss) term from a direct current bus voltage and a rotational speed of the VFM; and
   adjusting the Id term and the Iq term using the commanded torque and the ΔIss term prior to applying the feed-forward terms.

5. The method of claim 4, wherein determining the ΔIss term includes multiplying a modulation index command by a current electrical rotational speed of the VFM to derive a modulated value, and then feeding the modulated value through a proportional-integral block to derive the ΔIss term.

6. The method of claim 1, wherein calculating the dΔId term and the ΔIq term include processing the commanded shunt angle, the measured shunt angle, a commanded d-axis current, and a commanded q-axis current through one or more average inductance lookup tables to thereby determine an average d-axis inductance and an average q-axis inductance associated with the measured shunt angle and the commanded shunt angle, respectively.

7. The method of claim 1, further comprising:
   providing a direct current bus voltage, a torque slew command, and a rotary speed of the VFM into the separate d-axis and q-axis current command lookup tables; and
   determining the Id term and the Iq term via the separate d-axis and q-axis current command lookup tables using the direct current bus voltage, the torque slew command, and the rotary speed.

8. The method of claim 1, further comprising a torque control loop having a torque command calculation block and a torque estimate block, wherein the torque command calculation block is configured to determine a commanded torque from the commanded shunt angle, a commanded d-axis current, and a commanded q-axis current, wherein the torque estimate block is configured to determine an estimated torque from the measured shunt angle, the commanded d-axis current, and the commanded q-axis current, and wherein the commanded d-axis current and the commanded q-axis current are the adjusted Id term and the adjusted Iq term, respectively.

9. An electric powertrain comprising:
   a variable flux machine (VFM); and
   a controller in communication with the VFM, and configured to:
     during a shunt angle transition of the VFM, receive a commanded shunt angle and a measured shunt angle of the VFM when operating the VFM in a predetermined control region;
     calculate a d-axis delta current (ΔId) term and a q-axis delta current (ΔIq) term required to maintain an output torque level of the VFM through a duration of the shunt angle transition; and apply the required ΔId term and the required ΔId term as feed-forward terms to respectively adjust a d-axis current (Id) term and a q-axis current (Iq) term from a respective lookup table, and to thereby maintain the output torque level of the VFM during the shunt angle transition.

10. The electric powertrain of claim 9, wherein the shunt angle transition occurs while shunting hardware elements embedded within the VFM to impart a change in direction of magnetic flux transition from a first position to a second position, and the predetermined control region is a maximum torque per ampere (MTPA) operating region.

11. The electric powertrain of claim 9, wherein shunt angle transition occurs while shunting hardware elements embedded within the VFM to impart a change in direction of magnetic flux change positions, and the predetermined operating region is a field weakening (FW) control region.

12. The electric powertrain of claim 11, wherein the controller is configured to:
  receive a commanded torque of the VFM during the FW control region;
  determine a steady-state delta current (ΔIss) term from a direct current bus voltage and a rotational speed of the VFM; and
  adjust the Id term and the Iq term using the commanded torque and the ΔIss term prior to applying the feed-forward terms.

13. The electric powertrain of claim 12, wherein the controller is configured to determine the ΔIss term by multiplying a modulation index command by a current electrical rotational speed of the VFM to derive a modulated value, and then feed the modulated value through a proportional-integral block to derive the ΔIss term.

14. The electric powertrain of claim 9, wherein the controller is configured to calculate the dΔId term and the ΔIq term by processing the commanded shunt angle, the measured shunt angle, a commanded d-axis current, and a commanded q-axis current through one or more average inductance lookup tables to thereby determine an average d-axis inductance and an average q-axis inductance associated with the measured shunt angle and the commanded shunt angle, respectively.

15. The electric powertrain of claim 9, wherein the controller is configured to:
  provide a direct current bus voltage, a torque slew command, and a rotary speed of the VFM into the separate d-axis and q-axis current command lookup tables; and
  determine the Id term and the Iq term via the separate d-axis and q-axis current command lookup tables using the direct current bus voltage, the torque slew command, and the rotary speed.

16. The electric powertrain of claim 9, wherein the shunt angle transition occurs while hardware devices embedded within the VFM change positions to corresponding impart a change of direction in magnetic flux, and the controller includes a torque control loop having a torque command calculation block configured to determine a commanded torque from the commanded shunt angle, a commanded d-axis current, and a commanded q-axis current, and a torque estimate block configured to determine an estimated torque from the measured shunt angle, the commanded d-axis current, and the commanded q-axis current, wherein the commanded d-axis current and the commanded q-axis current are the adjusted Id term and the adjusted Iq term, respectively.

17. The electric powertrain of claim 16, wherein the shunt angle transition occurs over a transient response time corresponding with a back-EMF of the VFM varying while shunting elements of the VFM change positions, and further comprising: a driven load connected to the VFM.

18. The electric powertrain of claim 17, wherein the shunting elements are configured for imparting a change in direction of magnetic flux when changing positions and the driven load includes one or more road wheels of a motor vehicle.

19. A method for controlling transient operation of a permanent magnet (PM) machine, the method comprising:
  during operation of the PM machine in a maximum torque per ampere (MTPA) control region, receiving a commanded temperature and a measured temperature of the PM;
  calculating, via a controller using the commanded temperature, the measured temperature, a commanded d-axis current, and a commanded q-axis current, a d-axis delta current (ΔId) term and a q-axis delta current (ΔIq) term required to maintain an output torque level of the PM machine through a change of temperature of the PM machine in the MTPA region;
  providing a direct current bus voltage, a torque slew command, and a rotary speed of the PM into separate d-axis and q-axis current command lookup tables;
  determining the Id term and the Iq term via the separate d-axis and q-axis current command lookup tables using the direct current bus voltage, the torque slew command, and the rotary speed; and
  applying the required ΔId term and the required ΔId term as feed-forward terms to respectively adjust the Id term and the Iq term, thereby maintaining the output torque level of the PM machine during a shunt angle transition, the shunt angle transition occurring over a transient response time corresponding with a back-EMF of the PM machine varying while shunting elements embedded thereon change positions.

20. The method of claim 19, wherein the shunting elements are configured for imparting a change in direction of magnetic flux when changing positions, and calculating the ΔId term and the ΔIq term includes processing the commanded temperature, the measured temperature, the commanded d-axis current, and the commanded q-axis current through corresponding lookup tables to thereby determine a command torque and an estimated torque of the PM machine, respectively.

* * * * *